(12) United States Patent
Cho

(10) Patent No.: US 9,981,445 B2
(45) Date of Patent: May 29, 2018

(54) RIBBON TYPE FABRIC

(71) Applicant: DOOJI LTD., Namyangju (KR)

(72) Inventor: Hyuntae Cho, Namyangju (KR)

(73) Assignee: DOOJI LTD., Namyangju-si (KR)

( * ) Notice: Subject to any disclaimer, the term of this patent is extended or adjusted under 35 U.S.C. 154(b) by 386 days.

(21) Appl. No.: 14/890,661

(22) PCT Filed: Apr. 8, 2014

(86) PCT No.: PCT/KR2014/003042
§ 371 (c)(1),
(2) Date: Nov. 12, 2015

(87) PCT Pub. No.: WO2014/185630
PCT Pub. Date: Nov. 20, 2014

(65) Prior Publication Data
US 2016/0101586 A1 Apr. 14, 2016

(30) Foreign Application Priority Data
May 14, 2013 (KR) .......................... 10-2013-0054398

(51) Int. Cl.
*B32B 5/26* (2006.01)
*B32B 3/08* (2006.01)
(Continued)

(52) U.S. Cl.
CPC .................. *B32B 3/08* (2013.01); *B32B 5/26* (2013.01); *B32B 7/14* (2013.01); *D04D 9/04* (2013.01);
(Continued)

(58) Field of Classification Search
CPC ............ B32B 2250/20; B32B 2255/02; B32B 2255/26; B32B 2260/023;
(Continued)

(56) References Cited

FOREIGN PATENT DOCUMENTS

JP 07-44955 U 12/1995
KR 20-0323256 Y1 8/2003
(Continued)

OTHER PUBLICATIONS

International Search Report for PCT/KR2014/003042 dated Jul. 10, 2014.

*Primary Examiner* — Arti Singh-Pandey
(74) *Attorney, Agent, or Firm* — STIP Law Group, LLC

(57) ABSTRACT

The present invention relates to a ribbon type fabric produced through simple processes wherein a reinforcing fabric to which an adhesive means has previously been applied or overlapped with is layered on the surface of a narrow fabric cutout area of a ribbon type fabric created on a wide fabric, and the reinforcing fabric layered on the narrow fabric cutout area is simultaneously heated, pressed and cut or is heated, pressed and then cut according to fabric characteristics, and thus can maintain the tension of the ribbon type fabric by the reinforcing fabric while preventing selvage yarns on both edges of the cut ribbon type fabric from becoming loose, can be easily mass-produced while readily producing a ribbon type fabric from a wide fabric formed from a net fabric, a synthetic fiber fabric, a cotton fabric, a hemp fabric, or the like, and can enable further improvement in the adhesive force of the reinforcing fabric while obtaining decorative beauty by forming a character or a pattern on the surface of the reinforcing fabric adhesively layered on the ribbon type fabric.

6 Claims, 3 Drawing Sheets

(51) Int. Cl.
  *D04D 9/04* (2006.01)
  *D06M 17/00* (2006.01)
  *B32B 7/14* (2006.01)

(52) U.S. Cl.
  CPC ......... *D06M 17/00* (2013.01); *B32B 2250/20* (2013.01); *B32B 2255/02* (2013.01); *B32B 2255/26* (2013.01); *B32B 2260/023* (2013.01); *B32B 2260/046* (2013.01); *B32B 2262/02* (2013.01)

(58) Field of Classification Search
  CPC . B32B 2260/046; B32B 2262/02; B32B 3/08; B32B 5/26; B32B 7/14; D04D 9/04; D06M 17/00
  See application file for complete search history.

(56) References Cited

FOREIGN PATENT DOCUMENTS

| | | |
|---|---|---|
| KR | 10-1140571 B1 | 6/2012 |
| KR | 10-1228132 B1 | 2/2013 |
| WO | 2010-082708 A1 | 7/2010 |

RIBBON TYPE FABRIC

CROSS-REFERENCE TO RELATED APPLICATIONS

This application is the U.S. National Phase under 35 U.S.C. § 371 of International Application No. PCT/KR2014/003042 filed on Apr. 8, 2014, which in turn claims the benefit of Korean Application No. 10-2013-0054398, filed on May 14, 2013, the disclosures of which are incorporated by reference into the present application.

TECHNICAL FIELD

The present invention relates to a ribbon type fabric, and in particular to a ribbon type fabric wherein a reinforcing fabric material may be laminated, wherein after a reinforcing fabric material on the other side of which an adhering member has been previously coated or piled up one on another is laminated on a narrow width cutting position surface of a ribbon type fabric set on a wide width fabric material or a reinforcing fabric material is laminated in a state where an adhering member is adhered or piled up one on another on a narrow cutting position surface of a ribbon type fabric set on a wide fabric material, the reinforcing fabric material laminated on the narrow width cutting position may be simultaneously heated, pressurized and cut or a simple process for heating, pressurizing and then cutting based the characteristics of a fabric material, thus preventing any selvage on either edge of the cut ribbon type fabric from loosening while maintaining the tension of a ribbon type fabric with the aid of the reinforcing fabric material, and a wide width fabric material formed of mesh, woven fabric, synthetic fiber fabric, cotton cloth, bast fiber fabric, etc. may be easily manufactured into a ribbon type fabric, which can be easily mass-produced, and a decorative aesthetic effect can be obtained by forming characters or patterns on the surface of a reinforcing fabric material stuck on the ribbon type fabric, and the adhering force of the reinforcing fabric material can be further enhanced.

BACKGROUND ART

The generally known tape-shaped ribbon type fabric has been used for a decorative ribbon at a flower shop which is selling flowers for family events, messages or greeting being written on such a decorative ribbon. It may be used as a packing strap to pack a predetermined thing to look beautiful at a shop and may be used for a label or a lace of a clothes or an accessory product, whereupon the purpose of uses can be diversified.

The major material of such a ribbon type fabric used for the sake of various use purposes mainly is a synthetic resin fiber the price of which is low, but a cotton material can be used so as to create a luxury-looking atmosphere. It may be manufactured with various widths and in various colors to be used for each use purpose.

In the above-mentioned ribbon type fabric, in order to manufacture a wide width fabric material in general having a wider width into a narrow width ribbon fabric, a wide width fabric material having a predetermined thickness, for example, is divided into a narrow width ribbon type fabric, and then either edge of the divided ribbon type fabric is heated and compressed and cut. At this time, if the ribbon type fabric is a synthetic resin fabric, the selvages at edges of the ribbon type fabric get melted and stuck by the synthetic resin fiber itself, thus preventing any loosening of the selvage. If the ribbon type fabric is made of a cotton fabric or a bast fiber fabric, a resin is impregnated into the selvages of either edge of the ribbon type fabric and then is heated and compressed, thus preventing any loosening of the selvages.

At this time, if a heat cutting device is used, which is able to cut by heating a cutting portion during the cutting process, either edge portion of the finished ribbon type fabric may look tough due to the increased heat, namely, the edge portions may not be finished clean.

In addition, if the cutting process wherein cutting is performed on a narrow width is performed using a cutter, with either edge portion of the ribbon type fabric being folded with a predetermined width during the finishing process, a sewing may be performed or the adhering may be performed using a separate adhesive.

To this end, one side may be finished in a clean state, but since the other side may be finished unclear since a folded portion is formed due to the use of sewing or adhesive. In this case, since it needs to perform a process wherein either edge of the ribbon type fabric is folded with a predetermined width and an adhering process which is performed through a sewing work or using an adhesive, the whole process may become complicated, and the manufacturing cost may increase.

Meanwhile, in order to improve the above-mentioned problems, the applicant of the present application registered a ribbon type fabric of the Korean patent registration number 10-0925549 wherein a fabric material with a wide width is cut into desired width using an ultrasonic wave cutter, and a heat melting is performed so as to prevent any selvage from loosening from either edge of the cut fabric, and an actually woven feeling may be obtained from the entire exterior of the produced ribbon type fabric.

As illustrated in FIG. 1, as for the technical configuration thereof, with a fabric material 20 with a wider width is cut into a ribbon 10 with a narrow width by an ultrasonic wave cutter, the selvages at either edge of the ribbon 10 which has been cut with a narrow width are finished by means of a heating roller, and at this time, during the process wherein the selvages are heat-melted, characters or patterns 14 may be formed on the edges 12 by means of the patterns formed on a circumference of the heating roller. At this time, if the fabric material 20 having a wider width is made of cotton fabric, bast fiber fabric or cotton cloth, the edges 12 are heat-melted by the heating roller in a state where a melting agent made of a resin has been coated before the heat melting is performed by means of the heating roller.

In the finely woven synthetic fiber fabric material in a state where it has been cut into a narrow width, the selvages at the edges 12 can be easily heat-melted by the heating and compressing of the heating roller, thus preventing any loosening of the selvages, but in case of a mesh fabric material or a thin fabric material wherein a synthetic fiber is woven loosen like a meshed net, when either edge of the ribbon type fabric is heated and pressurized using the heating roller after a mesh or a thin fabric material has been cut into a ribbon type fabric having a narrow width by an ultrasonic wave cutter, the selvages may not be melted or adhered uniform, whereupon a loosening phenomenon may occur, wherein the selvages are loosened. If the mesh or the fabric material is made of cotton fabric, bast fiber fabric or cotton cloth, the impregnation of resin may become impossible due to a mesh net-like woven mesh or a thin structure or it may be impossible to obtain a predetermined tension in a ribbon type fabric. To this end, there may occur a disadvantageous problem wherein any loosening of the selvages from either edge of the ribbon type fabric cannot be prevented. In this case, it may, of course, be very hard to maintain the shape of a ribbon based on tension.

DISCLOSURE OF INVENTION

Technical Problem

Accordingly, the present invention is made in an effort to resolve the above mentioned problems. It is an object of the present invention to provide a ribbon type fabric wherein after a reinforcing fabric material on the other side of which an adhering member has been previously coated or piled up one on another is laminated on a narrow width cutting position surface of a ribbon type fabric set on a wide width fabric material, the reinforcing fabric material laminated on the narrow width cutting position may be simultaneously heated, pressurized and cut or a simple process for heating, pressurizing and then cutting based the characteristics of a fabric material, thus preventing any selvage on either edge of the cut ribbon type fabric from loosening while maintaining the tension of a ribbon type fabric with the aid of the reinforcing fabric material, and a wide width fabric material formed of mesh, woven fabric, synthetic fiber fabric, cotton cloth, bast fiber fabric, etc. may be easily manufactured into a ribbon type fabric, which can be easily mass-produced.

It is another object of the present invention to provide a ribbon type fabric wherein after a reinforcing fabric material is laminated on a narrow width cutting position surface of a ribbon type fabric set on a wide width fabric material in a state where an adhering member is coated or piled up one on another, the reinforcing fabric material laminated on the narrow width cutting position may be simultaneously heated, pressurized and cut or a simple process for heating, pressurizing and then cutting based the characteristics of a fabric material, thus preventing any selvage on either edge of the cut ribbon type fabric from loosening while maintaining the tension of a ribbon type fabric with the aid of the reinforcing fabric material, and a wide width fabric material formed of mesh, woven fabric, synthetic fiber fabric, cotton cloth, bast fiber fabric, etc. may be easily manufactured into a ribbon type fabric, which can be easily mass-produced.

It is further another object of the present invention to provide a ribbon type fabric wherein it is possible to obtain a decorative aesthetic effect in such a way to form characters or patterns during a process wherein heat and pressure are supplied onto the surface of a reinforcing fabric material stuck on a ribbon type fabric, and an adhering force of the reinforcing fabric material can be enhanced.

Solution to Problem

To achieve the above object, there is provided a ribbon type fabric, which may include, but is not limited to, a wide width fabric material;

a reinforcing fabric material which is laminated on the wide width fabric material so as to prevent a strand running and maintain a tension; and an adhering member which is laminated between the wide width fabric material and the reinforcing fabric material and can be melted and adhered by heat, the ribbon type fabric being divided and cut into narrow ribbon type fabrics by heating, pressurizing and cutting the wide width fabric material and the reinforcing fabric material, wherein the reinforcing fabric material is laminated on the narrow width cutting position of the wide width fabric material, and the adhering member allows a hot melt film to attach integral on the surface at the narrow width cutting position of the ribbon type fabric set on the wide width fabric material, and the reinforcing fabric material is laminated on the hot melt film, and the reinforcing fabric material laminated on the narrow width cutting position of the wide width fabric material is formed by cutting the intermediate portion simultaneously after it is pressurized and heated.

In addition, the reinforcing fabric material of the present invention is laminated on one side between the upper and lower sides of the wide width fabric material or on the upper and lower sides of the wide width fabric material.

In addition, the adhering member of the present invention is coated in such a way that an adhesive is previously sprayed on the other side of the reinforcing fabric material or it is coated by a touch of an adhesive-filled holder which discharges the adhesive onto the other side of the reinforcing fabric material.

Furthermore, the adhering member of the present invention is coated in such a way that an adhesive is sprayed on the surface of the narrow width cutting position of the ribbon type fabric set on the wide width fabric material or it is coated by a touch of an adhesive-filled holder, and thereafter, the reinforcing fabric material is laminated.

In addition, the adhering member is supplied and attached to the narrow width cutting position of the wide width fabric material after it is supplied in a state where a hot melt film is attached integral on the other side of the reinforcing fabric material.

In addition, the adhering member is attached to the narrow width cutting position of the wide width fabric material in such a way that the hot melt film is simultaneously supplied so that it can position on the lower surface of the reinforcing fabric material when supplying the reinforcing fabric material.

Meanwhile, the wide width fabric material is made of a meshed fabric.

Advantageous Effects

In the ribbon type fabric according to the present invention, a reinforcing fabric material may be laminated, wherein after a reinforcing fabric material on the other side of which an adhering member has been previously coated or piled up one on another is laminated on a narrow width cutting position surface of a ribbon type fabric set on a wide width fabric material or a reinforcing fabric material is laminated in a state where an adhering member is adhered or piled up one on another on a narrow cutting position surface of a ribbon type fabric set on a wide fabric material, the reinforcing fabric material laminated on the narrow width cutting position may be simultaneously heated, pressurized and cut or a simple process for heating, pressurizing and then cutting based the characteristics of a fabric material, thus preventing any selvage on either edge of the cut ribbon type fabric from loosening while maintaining the tension of a ribbon type fabric with the aid of the reinforcing fabric material, and a wide width fabric material formed of mesh, woven fabric, synthetic fiber fabric, cotton cloth, bast fiber fabric, etc. may be easily manufactured into a ribbon type fabric, which can be easily mass-produced, and a decorative aesthetic effect can be obtained by forming characters or patterns on the surface of a reinforcing fabric material stuck on the ribbon type fabric, and the adhering force of the reinforcing fabric material can be further enhanced.

The present invention has been described and illustrated in relation with specific exemplary embodiments, but it is noted that a person having ordinary skill in the art can variously modify or change the present invention without departing from the spirits and cope of the present invention recited in the claims below.

LEGEND OF REFERENCE NUMBERS

100: Wide width fabric material 110: Ribbon type fabric
120: Narrow width cutting position 130: Adhering member
140: Reinforcing fabric material

BEST MODES FOR CARRYING OUT THE INVENTION

The exemplary embodiments of the present invention will be described with reference to the accompanying drawings.

Figure 1:
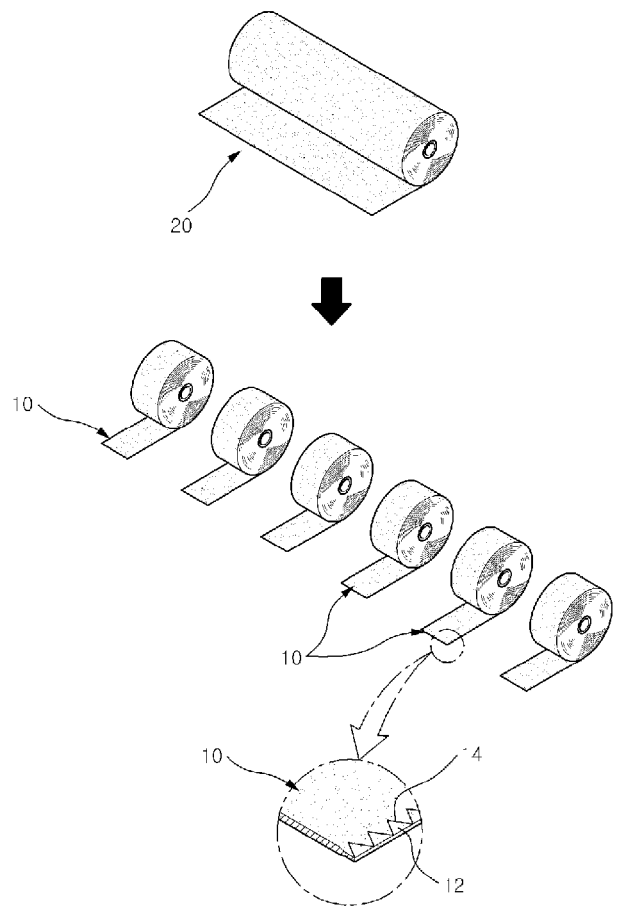
FIG. 1 is a schematic view for describing a manufacturing procedure of a conventional ribbon type fabric.
Figure 2A:
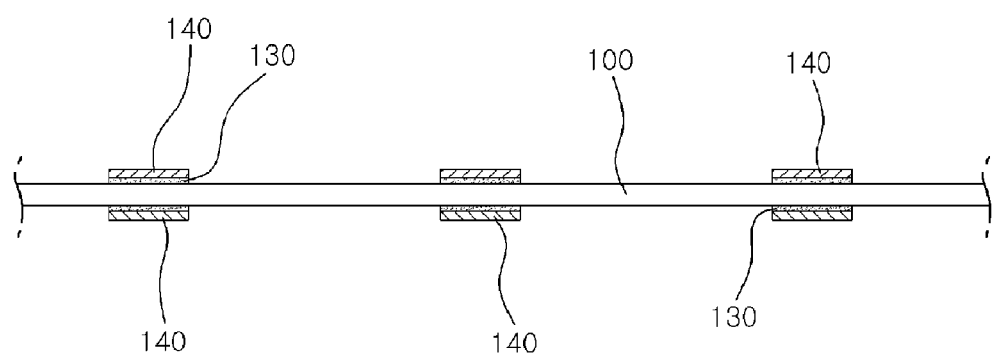
FIGS. 2A and 2B are views illustrating cross sectional configurations in a state before a reinforcing fabric material on which an adhering member has been previously coated is stuck on a wide width fabric and is heated and pressurized according to the present invention and a state where it is heated and pressurized according to the present invention.
Figure 2B:
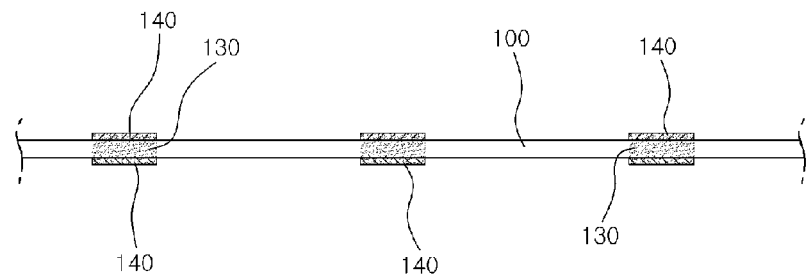
Figure 3:
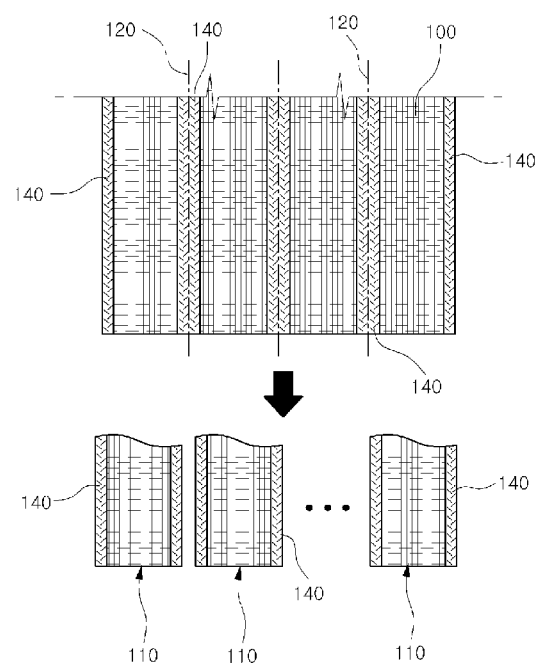
FIG. 3 is a view illustrating a state where a reinforcing fabric material on which an adhering member has been previously coated is stuck on a wide width fabric and then is cut into a ribbon type fabric.
Figure 4A:
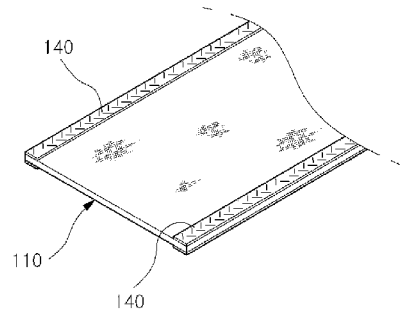
FIGS. 4A an 4B are schematic perspective views illustrating an occasion where a ribbon type fabric on either side of which a reinforcing fabric material has been stuck is a common fabric material and an occasion where it is a meshed fabric material.
Figure 4B:
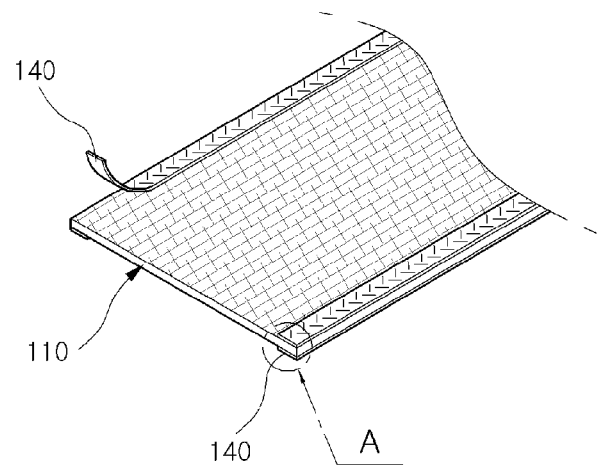
Figure 5:
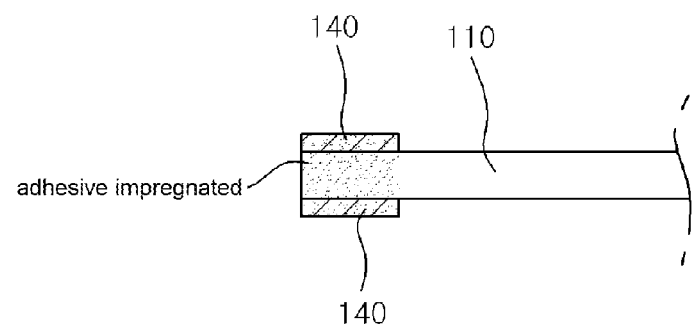
FIG. 5 is an enlarged cross sectional configuration view illustrating the portion "A" in FIG. 4B.

FIGS. 2A and 2B are views illustrating cross sectional configurations in a state before a reinforcing fabric material on which an adhering member has been previously coated is stuck on a wide width fabric and is heated and pressurized according to the present invention and a state where it is heated and pressurized according to the present invention. FIG. 3 is a view illustrating a state where a reinforcing fabric material on which an adhering member has been previously coated is stuck on a wide width fabric and then is cut into a ribbon type fabric. FIGS. 4A an 4B are schematic perspective views illustrating an occasion where a ribbon type fabric on either side of which a reinforcing fabric material has been stuck is a common fabric material and an occasion where it is a meshed fabric material. FIG. 5 is an enlarged cross sectional configuration view illustrating the portion "A" in FIG. 4B. A reinforcing fabric material 140 may be laminated on a wide width fabric material 100 formed of meshed fabric material, synthetic fiber fabric, cotton fabric or bast fiber fabric so as to maintain a tension at a narrow cutting position 120 of the ribbon type fabric 110 set to have a predetermined width while preventing a strand from running from the selvage at the edge when cutting.

At this time, an adhering member 130 which is able to melt and adhere by heat may be laminated between the wide width fabric material 100 and the reinforcing fabric material 140, and the wide width fabric material 100 and the reinforcing fabric material 140 are heated and pressurized, and an intermediate portion of the reinforcing fabric material 140 corresponding to the narrow cutting position 120 of the ribbon type fabric 110 is simultaneously cut, thus forming a narrow width ribbon type fabric 110.

At this time, the wide width fabric material 100 and the reinforcing fabric material 140 may be heated and pressurized based on the materials of fabrics, and it does not matter even to cut the intermediate portion of the reinforcing fabric material 140 corresponding to the narrow width cutting position 120 of the ribbon type fabric 110, and it does not matter even though the wide width fabric material 1000 and the reinforcing fabric material 140 are heated and pressurized while cutting the intermediate portion of the reinforcing fabric material 140 corresponding to the narrow width cutting position 120 of the ribbon type fabric 110 based on the material of the fabric.

In addition, the reinforcing fabric material 140 on which the adhering member 130 is laminated may be cut while heating and pressurizing against one surface of the wide width fabric material 100 or the upper and lower surfaces of the wide width fabric material 100 or may be cut after heating and pressurizing. Characters or patterns may be formed on the surface of the reinforcing fabric material 140 when heating and pressurizing the reinforcing fabric material 140 which is stuck on the ribbon type fabric 110.

The operations and effects of the thusly constituted present invention will be described in detail.

As illustrated in FIGS. 2 to 5, in a state where the narrow width cutting position 120 of the ribbon type fabric 110 is set with a predetermined width on the wide width fabric material 100 which is made of meshed fabric, synthetic fiber fabric, cotton fabric or bast fiber fabric, an adhering member 130 which can be melted by heat and adhered may be laminated as illustrated in FIG. 2A between the wide width fabric material 100 and the reinforcing fabric material 140.

At this time, the adhering member 130 may be formed in such a way that an adhesive is previously spray-coated and laminated on the other side of the reinforcing fabric material 140 or it may be coated and laminated on the other side of the reinforcing fabric material 140 by a touch of an adhesive-filled holder from which an adhesive can discharge. In addition, it may be laminated in such a way that a hot melt film is attached integral on the other side of the reinforcing fabric material 140 or it may be laminated by a simultaneous supply so that the hot melt film can be position on the other side of the reinforcing fabric material 140.

At this time, it does not matter even though the adhering member 130 is formed in such a way that the reinforcing fabric material 140 is laminated in a state where the adhering member is coated or piled up one on another on the surface of the narrow width cutting position 120 of the ribbon type fabric set on the wide width fabric.

The lamination may be performed in such a way that an adhesive is coated on the other side of the reinforcing fabric material 140 with the aid of an adhering core formed by attaching nylon, polyethylene, polyvinyl chloride, etc. using the adhering member 130 by using a non-woven cloth as a ground cloth.

The wide width fabric material 100 and the reinforcing fabric material 140 which are supplied with the adhering member 130 being laminated are heated and pressurized by a separately provided heating and pressurizing unit (not illustrated), the adhering member 130 can be pressurized as soon as it is melted by heat, whereupon the adhering member 130 can be hardened as illustrated in FIG. 2B with the adhering member 130 penetrated into between the woven portions of the wide width fabric material 100 and the reinforcing fabric material 140, whereby the adhering force can be enhanced more.

The adhering member 130 may be adhered and fixed since the wide width fabric material 100 and the reinforcing fabric material 140 are heated and pressurized. As illustrated in FIG. 3, the narrow cutting position 120 corresponding to the center of the adhered and fixed reinforcing fabric material 140 as illustrated in FIG. 3 may be cut as soon as it is heated and pressurized, thus conveniently and easily manufacturing the narrow ribbon type fabric 110. To this end, it is possible to mass-produce the ribbon type fabric without any strand running from the selvage.

At this time, it is preferred that the cutting at the narrow width cutting position 120 corresponding to the center of the reinforcing fabric material 140 is performed using an ultrasonic wave cutting unit (not illustrated).

In case of the cutting at the narrow width cutting position 120 corresponding to the center of the reinforcing fabric material 140, it does not matter if the cutting is performed at the same time the heating and pressurizing is performed based on the material of the fabric or the cutting is performed after heating and pressurizing or the heating and pressurizing is performed while cutting.

In addition, the reinforcing fabric material 140 may be laminated on the narrow width cutting position 120 of the ribbon type fabric 110 set with a predetermined width on the wide width fabric material 100. When the central portion of the reinforcing fabric material 140 is cut using the ultrasonic wave unit, the stand running from the selvage at the edge can be prevented after the cutting with the aid of heat melting while maintaining a predetermined tension.

In addition, the reinforcing fabric material 140 on the other side of which the adhering member 130 is laminated may be laminated in such a way that it is heated and pressurized onto one side between the upper and lower sides of the narrow width cutting position 120 of the wide width fabric material 100 or on the upper and lower sides of the wide width fabric material 100.

At this time, the reinforcing fabric material 140 may allow to maintain an enough tension together with the ribbon type fabric 110 cut with a predetermined width in such a way to form it using synthetic fiber fabric, cotton fabric, bast fiber fabric or aluminum thin plate, copper thin plate, etc.

The narrow width cutting position 120 of the ribbon type fabric of the wide width fabric material 100 on which the reinforcing fabric material 110 is laminated and stuck may allow the narrow width cutting position 120 to be cut to form a ribbon type fabric in a state where it is heated and pressurized by the ultrasonic wave cutting unit. At this time, as illustrated in FIG. 2B, the reinforcing fabric material corresponding to the edge of the cut ribbon type fabric 110 is laminated in a state where the adhesive of the adhering member 130 of the hot melt film penetrates into between the ribbon type fabric 110 and the reinforcing fabric material 140 since the ribbon type fabric 110 and the reinforcing fabric material 140 at the edge thereof are heat-melted together, thus maintaining a tensional force at the ribbon type fabric 110. In addition, since the selvages at the edges of both sides of the ribbon type fabric 110 are stably attached and fixed by the heating pressurizing of the adhering member 130 laminated on the reinforcing fabric 140, thus preventing any strand running from the selvage.

In addition, if the wide width fabric material 100 is made from a cotton fabric or a bast fiber fabric, not a synthetic resin fabric, the reinforcing fabric material 140 stuck on the narrow width cutting position 120 of the wide width fabric material 100 is heated, pressurized and cut since it is supplied before the adhering member 130 is coated and laminated and attached and laminated or it is simultaneously supplied, whereupon the central portion of the reinforcing fabric material 140 can be easily adhered and fixed, thus performing the cutting work. In addition, it is possible to maintain the shape of a beautiful ribbon with the thusly finished ribbon type fabric, and mass production can be easily obtained.

Meanwhile, characters or patterns may be formed on the surface of the reinforcing fabric material 140 stuck on the ribbon type fabric 110 when heating and pressurizing the reinforcing fabric material 140, whereupon it is possible to more stably adhere the ribbon type fabric 110 and the reinforcing fabric material 140. To this end, the stand running can be prevented, and since various characters and patterns can be formed, it is possible to enhance an aesthetic effect on the ribbon type fabric which in general is used for decoration purposes.

The invention claimed is:

1. A ribbon type fabric, comprising:
a wide width fabric material;
a reinforcing fabric material which is laminated on the wide width fabric material so as to prevent a strand running and maintain a tension; and
an adhering member which is laminated between the wide width fabric material and the reinforcing fabric material and can be melted and adhered by heat, the ribbon type fabric being divided and cut into narrow ribbon type fabrics by heating, pressurizing and cutting the wide width fabric material and the reinforcing fabric material,
wherein the reinforcing fabric material is laminated on the narrow width cutting position of the wide width fabric material, and the adhering member allows a hot melt film to attach integral on the surface at the narrow width cutting position of the ribbon type fabric set on the wide width fabric material, and the reinforcing fabric material is laminated on the hot melt film, and the reinforcing fabric material laminated on the narrow width cutting position of the wide width fabric material is formed by cutting the intermediate portion simultaneously after it is pressurized and heated.

2. The fabric of claim 1, wherein the reinforcing fabric material is laminated on one side between the upper and lower sides of the wide width fabric material or on the upper and lower sides of the wide width fabric material.

3. The fabric of claim 1, wherein the adhering member is coated in such a way that an adhesive is previously sprayed on the other side of the reinforcing fabric material or it is coated by a touch of an adhesive-filled holder which discharges the adhesive onto the other side of the reinforcing fabric material.

4. The fabric of claim 1, wherein the adhering member is coated in such a way that an adhesive is sprayed on the surface of the narrow width cutting position of the ribbon type fabric set on the wide width fabric material or it is coated by a touch of an adhesive-filled holder, and thereafter, the reinforcing fabric material is laminated.

5. The fabric of claim 1, wherein the adhering member is supplied and attached to the narrow width cutting position of the wide width fabric material after it is supplied in a state where a hot melt film is attached integral on the other side of the reinforcing fabric material.

6. The fabric of claim 1, wherein the adhering member is attached to the narrow width cutting position of the wide width fabric material in such a way that the hot melt film is simultaneously supplied so that it can position on the lower surface of the reinforcing fabric material when supplying the reinforcing fabric material.

\* \* \* \* \*